G. V. BENNINGHOFF.
TIRE.
APPLICATION FILED JAN. 8, 1912.
1,036,955.
Patented Aug. 27, 1912.
2 SHEETS—SHEET 1.
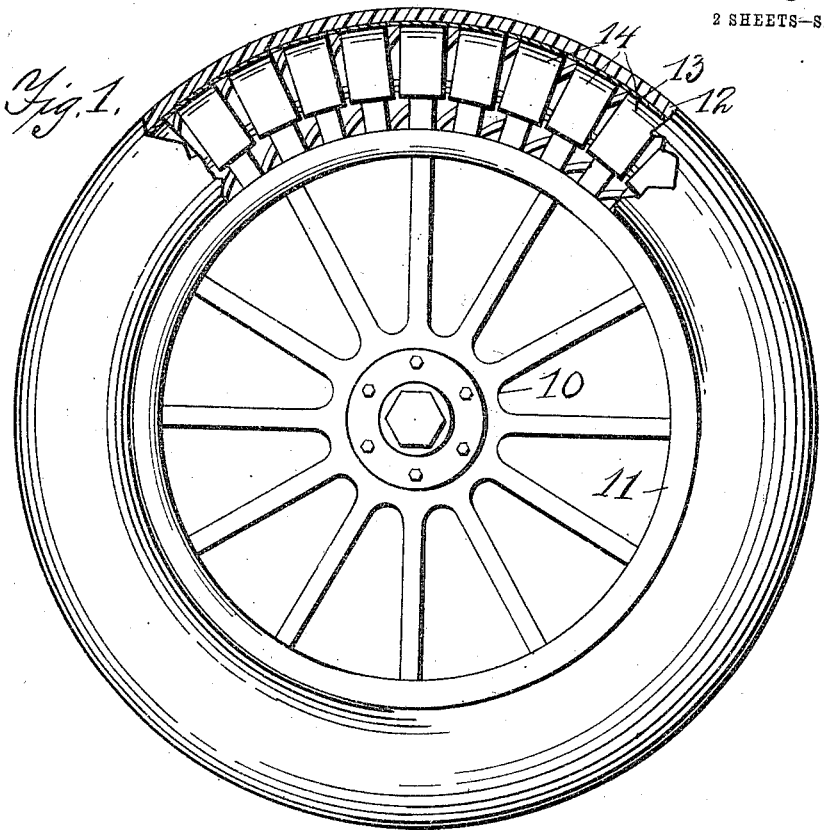
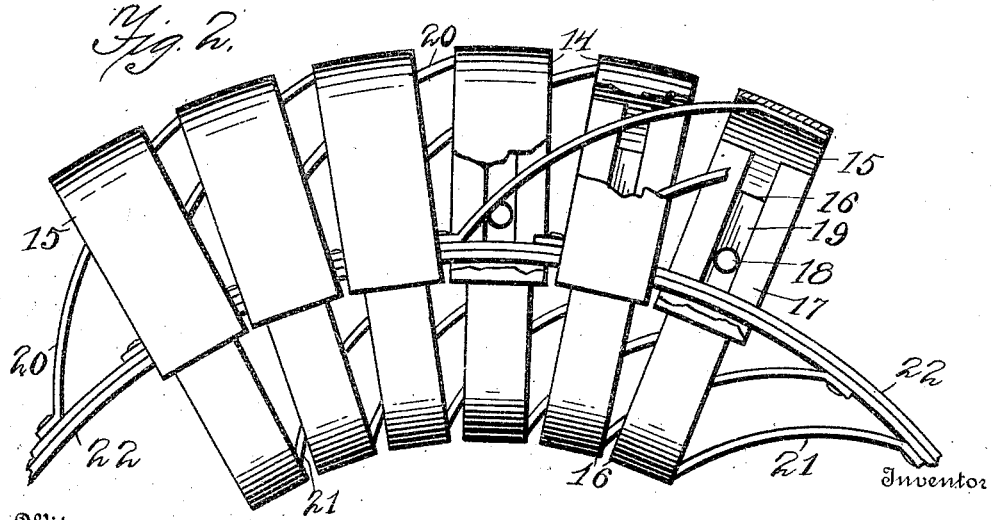

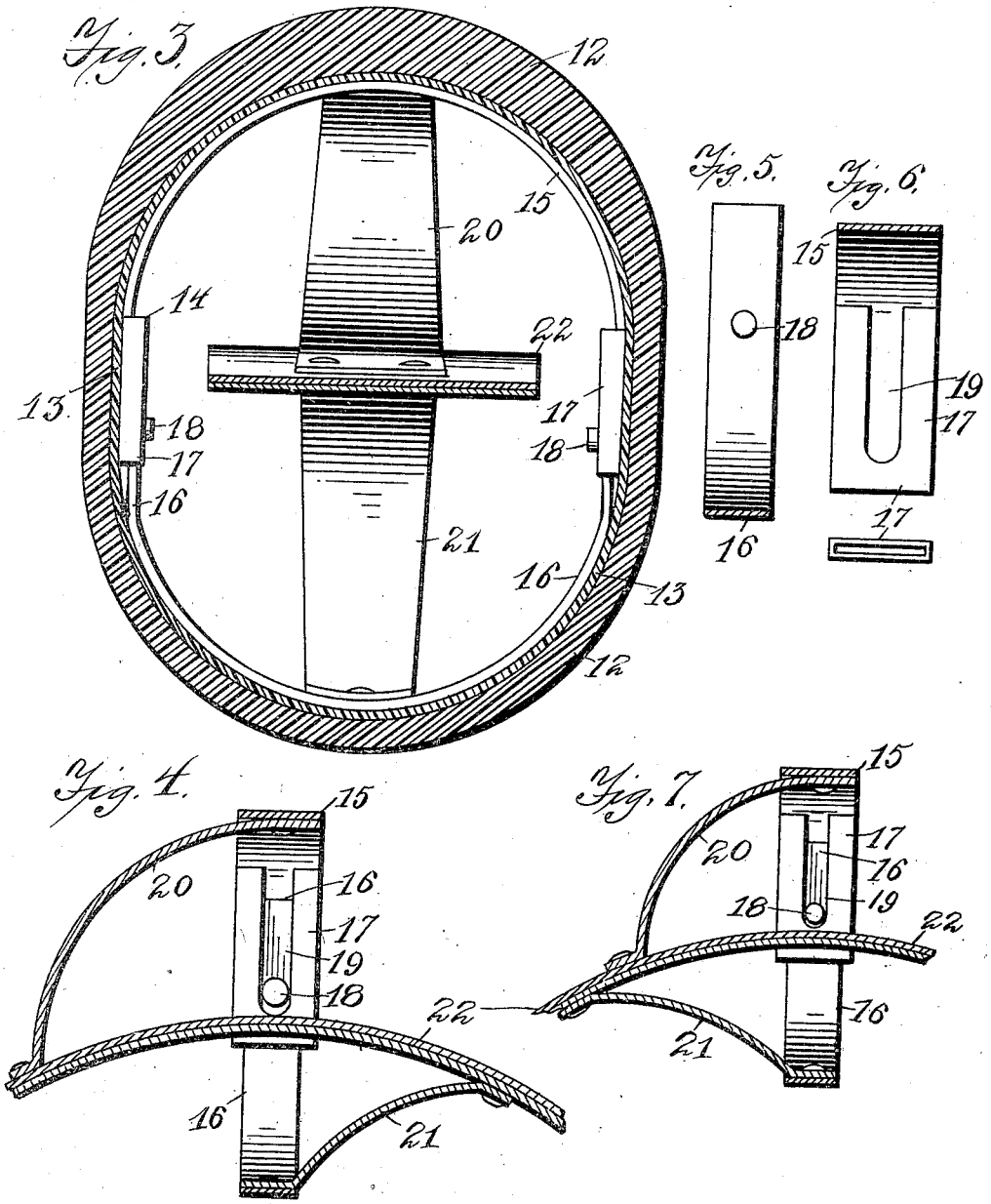

UNITED STATES PATENT OFFICE.

GEORGE V. BENNINGHOFF, OF MEADVILLE, PENNSYLVANIA.

TIRE.

1,036,955.

Specification of Letters Patent.  Patented Aug. 27, 1912.

Application filed January 8, 1912. Serial No. 669,939.

*To all whom it may concern:*

Be it known that I, GEORGE V. BENNINGHOFF, a citizen of the United States, residing at Meadville, in the county of Crawford and State of Pennsylvania, have invented certain new and useful Improvements in Tires, of which the following, taken in connection with the accompanying drawings, is a specification.

The invention relates to elastic or spring tires for vehicles; and the object of the improvement is to provide a balanced spring construction for tires which is strong and durable and imparts resiliency without the need of pneumatic inflation; and the invention consists in certain novel features of construction and in the arrangement and combination of the parts as shown and described in this specification and the accompanying drawings and pointed out in the claims.

In the drawings, Figure 1 is an elevation of a wheel having a spring tire made in accordance with my improvement, a portion of the outer casing of the tire being broken away to show the arrangement of the inner springs and expanding rings. Fig. 2 is an elevation of a portion of the springs and the expandible and collapsible metal rings, without the outer casing. Fig. 3 is a crosswise sectional view of the tire showing the arrangement of the springs in relation to the outer casing. Fig. 4 is a lengthwise sectional view of a portion of the supporting ring or band and one of the expanding rings attached thereto. Fig. 5 shows a sectional view from the inner side of one of the parts of the ring sections; and Fig. 6 shows a similar view of the outer part of the ring section and an end view of the same, showing the slot for the insertion of the other part. Fig. 7 is a sectional view similar to Fig. 4 of a modification in the arrangement of the supporting springs for the ring section.

Like numerals of reference refer to corresponding parts in the several views.

The numeral 10 designates the wheel which has a metal rim 11 attached to the outer ends of the spokes.

The numeral 12 designates the outer casing of the spring tire which is preferably made of rubber in the usual manner and is attached to rim 11. The casing 12 preferably has a lining 13 of soft or resilient tough rubber against which the rings 14 press.

The metallic spring construction consists of the rings 14 which are preferably made in two parts 15 and 16, the part 15 being arranged with a loop 17 on each of its ends into which the ends of the part 16 are slipped, a pin 18 on the part 16 extending within the lengthwise slot 19 in loop 17 so that the parts cannot become disengaged from one another by the ends of part 16 slipping out of the loops 17.

The rings 14 are shaped to conform to the tubular inner side or the opening within the casing 12, and the parts 15 and 16 of the rings 14 are held firmly against the inner sides of the casing 12 by the springs 20 and 21, one end of the springs 20 and 21 being attached to the parts 15 and 16, and the other ends of said springs being attached to a ring or rim 22 which is preferably made of two thicknesses of sheet metal and extending around within the casing 12 about midway between the sides of the same in a continuous band or ring 22. The springs 20 and 21 perferably extend to parts 15 and 16 from opposite sides of the same, as shown in Figs. 1, 2 and 4. Though the modified form shown in Fig. 7 would serve a good purpose in balancing the action of the ring 14, I find, however, that with the springs 20 and 21 extending from opposite sides of the ring 14 and so continuing around the tire for the different rings 14, said rings are better braced against the shocks brought to bear upon the tire from all directions.

It is apparent that with the two parts 15 and 16 inserted one within the other, or with telescoping ends, that said parts may slide back and forth upon one another thereby allowing the springs 20 and 21 free action. The springs 20 and 21 are preferably made broad, as shown in Fig. 3, and of sufficient thickness to give the required strength to withstand the shocks which will naturally come upon a resilient tire and according to the size of the tire and the weight of the vehicle. The rings 14 pressing against the resilient rubber band 13 and casing 12 in combination with the springs 20 and 21 and the double spring rim or band 22 give a combined resiliency and holding power which enables the tire to withstand the heaviest shocks.

I claim as new:

1. A tire comprising a resilient tubular casing, a supporting band extending around said casing within the same, a series of collapsible rings around said supporting band to bear against the inner side of said tubular casing, and a supporting spring attached to each side of said supporting band and attached to each of said collapsible rings, said springs extending in opposite directions from said collapsible rings to said band.

2. A tire comprising a resilient tubular casing, a supporting band extending around said casing within the same, a series of rings around said supporting band to bear against the inner side of said tubular casing, said rings each formed of telescoping parts, and a leaf spring on each side of said supporting band to resiliently press each of said parts against the inner side of said tubular casing.

3. A tire comprising a resilient tubular casing, a supporting band extending around said casing within the same, a series of rings around said supporting band to bear against the inner side of said tubular casing, said rings composed of two telescoping parts, a projection on one of said parts extending through a slot in the other part to prevent the separation of said parts, and a leaf spring support for each of said parts on said band, said leaf springs extending in opposite directions from each of said rings.

In testimony whereof I have affixed my signature in the presence of two witnesses.

GEORGE V. BENNINGHOFF.

Witnesses:
  A. W. NETTLE,
  H. U. HARRIS.

---

Copies of this patent may be obtained for five cents each, by addressing the "Commissioner of Patents, Washington, D. C."